United States Patent [19]

Morin

[11] 4,375,244

[45] Mar. 1, 1983

[54] HAULING VEHICLE FOR LARGE AIRCRAFT

[75] Inventor: Andre M. R. Morin, Chatillon sur Thouet, France

[73] Assignee: SOVAM, Parthenay, France

[21] Appl. No.: 141,202

[22] Filed: Apr. 17, 1980

[30] Foreign Application Priority Data

Apr. 18, 1979 [FR] France ................... 79 09807

[51] Int. Cl.³ ............................................. B60P 3/06
[52] U.S. Cl. ................................. 180/14 C; 414/429
[58] Field of Search ..................... 180/14 C, 14 R; 414/429, 426; 244/50

[56] References Cited

U.S. PATENT DOCUMENTS

| | | | |
|---|---|---|---|
| 2,357,633 | 9/1944 | Cogwill | 180/14 C |
| 2,380,415 | 7/1945 | Carruthers | 414/429 |
| 2,388,692 | 11/1945 | House | 414/429 X |
| 2,505,352 | 4/1950 | Dillon | 180/14 C |
| 2,798,729 | 7/1957 | Paul | 180/14 C |
| 3,688,857 | 9/1972 | Miller | 180/14 C |

FOREIGN PATENT DOCUMENTS 52-29017  4/1977  Japan ................... 180/14 C

*Primary Examiner*—John A. Pekar
*Attorney, Agent, or Firm*—Carothers and Carothers

[57] ABSTRACT

A hauling vehicle, notably for hauling big aircraft, has an elevatable framework provided with a recess extending inwardly from one end with guideways in its side walls, in each of which there is a pair of spaced slides. Mounted in the slides are the axles of elongated horizontal support members or sole-pieces pivotally supporting parallel upper and lower shoes. The recess can be opened to receive aircraft wheels by swinging out the shoes at the outer end of the recess. After the shoes have been swung back into place, the slides in each guideway can be moved toward each other to engage all of the shoes with the aircraft wheels in the recess.

6 Claims, 3 Drawing Figures

HAULING VEHICLE FOR LARGE AIRCRAFT

The present invention relates to a hauling vehicle, notably for hauling big aircraft, said hauling vehicle being designed to haul and manipulate aircraft either at the boarding place of passengers, or between the airport buildings and the workshop.

It is already known to haul aircraft more or less great distances by means of a bar forming a shaft secured on the one hand to the tractor and, on the other, to the T handle of the front wheels of the aircraft. The drawback shown by such a mode of hauling is to make manoeuvres only in the direction of the traction, the pushing of the aircraft being difficult since there are two hinged points at each end of the bar; so as to manoeuvre an aircraft by pushing it with such a bar, it is necessary to be very skilful and accustomed to same.

Where an aircraft is pulled by means of a traction bar, the speed cannot be very great and only be of about 25 km/h. As a matter of fact, there is then a phenomenon of twists or pitching of the aircraft. Now, in modern airports it is necessary that aircraft move relatively great distances between the boarding or unloading places and workshops; in some airports said distances are in the region of several kilometers.

In some cases, the flying personnel direct themselves towards workshops with the aid of the engines of the aircraft. Such a way of proceeding has the drawback that it necessitates the intervening of said flying personnel which is onerous and moreover results in an important consumption of energy.

To remedy these drawbacks, it is already known to employ a powerful tractor (driven by a big 1,200 HP engine) which takes in charge the front wheels of the aircraft by lifting them up so as to remove said aircraft more quickly. By means of this known machine it is possible to pull an aircraft at relatively high speeds in the region of 50 km/h.

However, such a solution has the drawback that it compels loading the set of front wheels of the aircraft by means of a shovel. As a matter of fact, one of the ends of the vehicle carries a plate forming a shovel. When moving backwards said vehicle engages said shovel beneath the front set of wheels of the aircraft so as to load the wheels thereon. Now, when large-sized aircraft are involved, the load resting on the front T-shaped axle assembly may reach 35 tons. This means that the shovel must be very strong to be introduced as a wedge between the wheel and the ground. In addition, the load exerted by the tail skid of the aircraft requires an important counterweight. So as to prevent the tractor from supporting a too heavy load, said tractor is made very long and thus is over 9 meters in length. Now, such a length practically does not permit to perform tight manoeuvres at the landing point. A further drawback of said known solution is that the shovel lifts up the aircraft by 30 to 40 cm, that is at the height that said aircraft keeps when it is thus loaded on the tractor. Now, the positioning of the tractor and of the shovel thereof beneath the front wheels of an aircraft should be performed while the passages of access to the aircraft are still available, this to save time. Now, if the front part of the aircraft is lifted up by 30 to 40 cm one runs the risk of making the door of the aircraft bump against the elements of the vestibule connecting the passage to the aircraft; thus, one runs the risk of pulling out or deforming the hinges of the door of the aircraft. As a result, it is necessary to await until the passages are disconnected before loading the front set of wheels of the aircraft on the tractor.

The present invention is aimed at remedying said various drawbacks and to this end provides a hauling vehicle, notably for hauling big aircrafts, of a simple construction, very easy to manipulate and making it possible to efficiently pull or push big aircraft great distances at relatively high speeds.

Also, the present invention is aimed at providing a hauling vehicle of a small length, particularly making easier any type of manoeuvres sought when aircraft are moved around airport buildings, thus preventing any overhang problems and important changes in level.

To this end, the present invention relates to a hauling vehicle, notably for hauling big aircraft, carrying a framework bearing a driving engine, steering mechanism and other elements necessary to the operation of said vehicle, wherein there is a receiving or catching means and a means for holding the wheels of the aircraft to be pulled or pushed.

According to a further characteristic feature of the invention, both catching and holding means carry abutments mounted pivotally on the framework of the hauling vehicle, arranged at each side of at least a wheel of the aircraft.

According to another characteristic feature of the invention, said abutments consist of elongated horizontal supports, referred to herein as sole-pieces, mounted pivotally on the framework, a shoe at least being hinged on said sole-pieces.

Such a device makes it possible to efficiently hold the wheels of the aircraft.

According to a further characteristic feature of the invention, the catching and holding devices carry slides mounted about the axles bearing the sole-pieces, said slides being movable under the action of a hydraulic jack for moving said sole-pieces against the wheels of the aircraft or releasing the latter.

According to another characteristic feature of the invention, the sole-pieces consist of a main sole-piece extending over all the width of the framework, and of two secondary sole-pieces extending in prolongation of one another, each of them over the half width of the framework.

By making both secondary sole-pieces pivot, either horizontally or vertically, it is made possible to position the wheels of the aircraft into the catching and holding devices.

According to another characteristic feature of the invention, the framework is capable of being lifted up.

Said lifting motion makes it possible to lift up the wheels of the aircraft by a few centimeters above the ground. Said lifting can be obtained, for example by activating the suspension of the framework.

According to a further characteristic feature of the invention, the catching and holding devices are fitted in a part of the framework whose height is capable of being varied in relation to said devices.

Thanks to the raising of said part of the framework it is possible to lift up the wheels of the aircraft. Said part of the framework is lifted up by the positioning of a hinge at the front part of said framework and of jacks at the rear part of said framework.

Finally, according to another characteristic feature of the invention, the axles of the sole-pieces and shoes are kept in an average position by a flexible device.

Said flexible device makes it possible to adapt the holding and tightening devices to various types of wheels with different diameters.

The present invention will be better understood by means of an embodiment of a hauling vehicle according to said invention diagrammatically shown by way of non-limiting example in the attached drawings, wherein.

Figure 1:
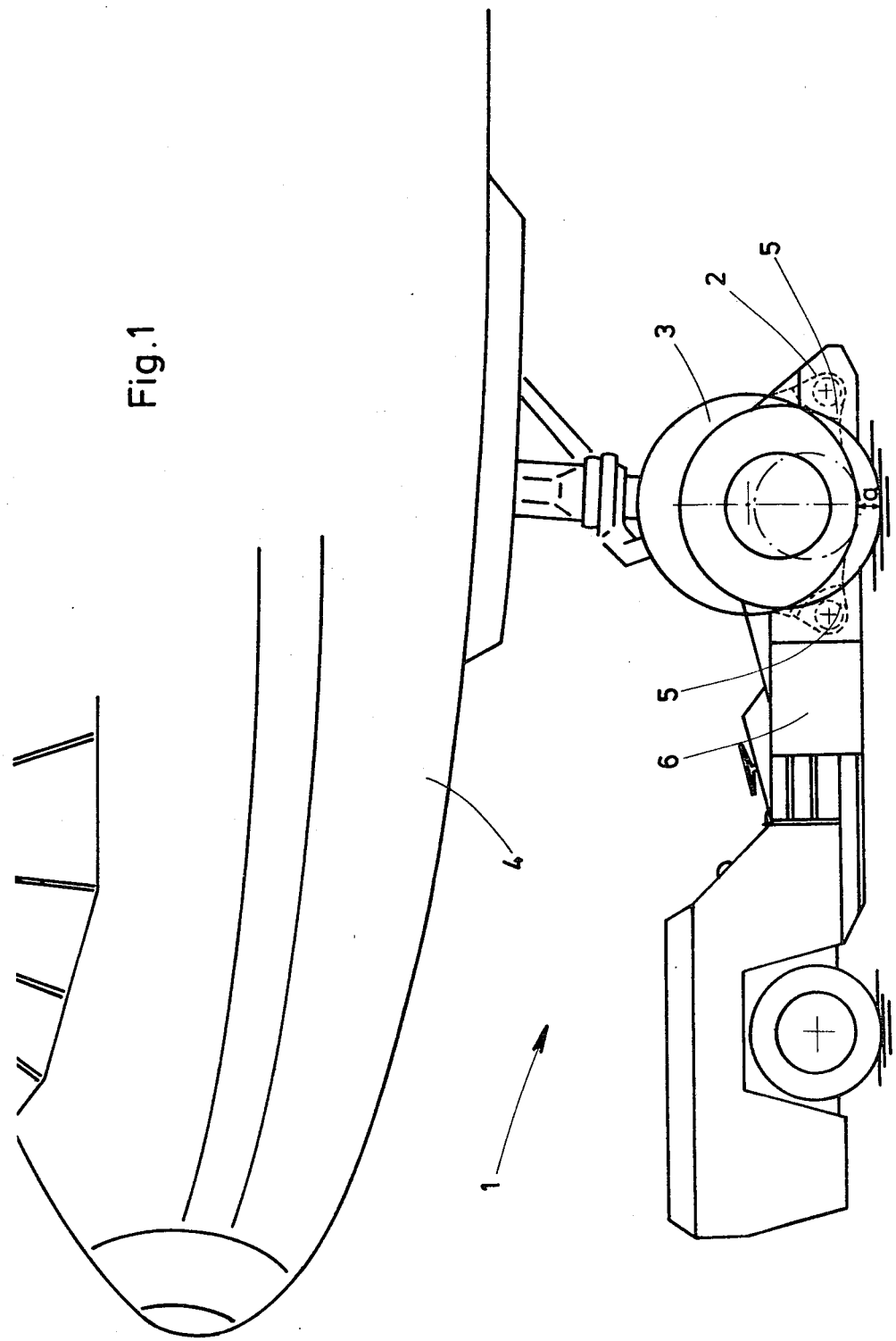
FIG. 1 is a side view of the hauling vehicle in operation.

As shown in FIG. 1, the hauling vehicle 1 is in a working position. It carries catching and holding devices 2 on which the wheels 3 of the aircraft 4 are loaded. The length of said hauling vehicle 1 is relatively small. This is made possible because the catching and holding devices 2, consisting of abutments 5 mounted pivotally on the framework 6, lift up the wheels 3 of the aircraft by a few centimeters only above the ground. The space between the wheel of the aircraft and the ground is represented by "a". Also, said relatively small space makes it possible to reduce the length of the hauling vehicle 1, because it does not give rise to any problem of overhang as is the case for the hauling vehicles disclosed by the Prior Art. In addition, according to the invention it is possible to either pull or push the aircraft 4 at rather high speeds.

Figure 2:
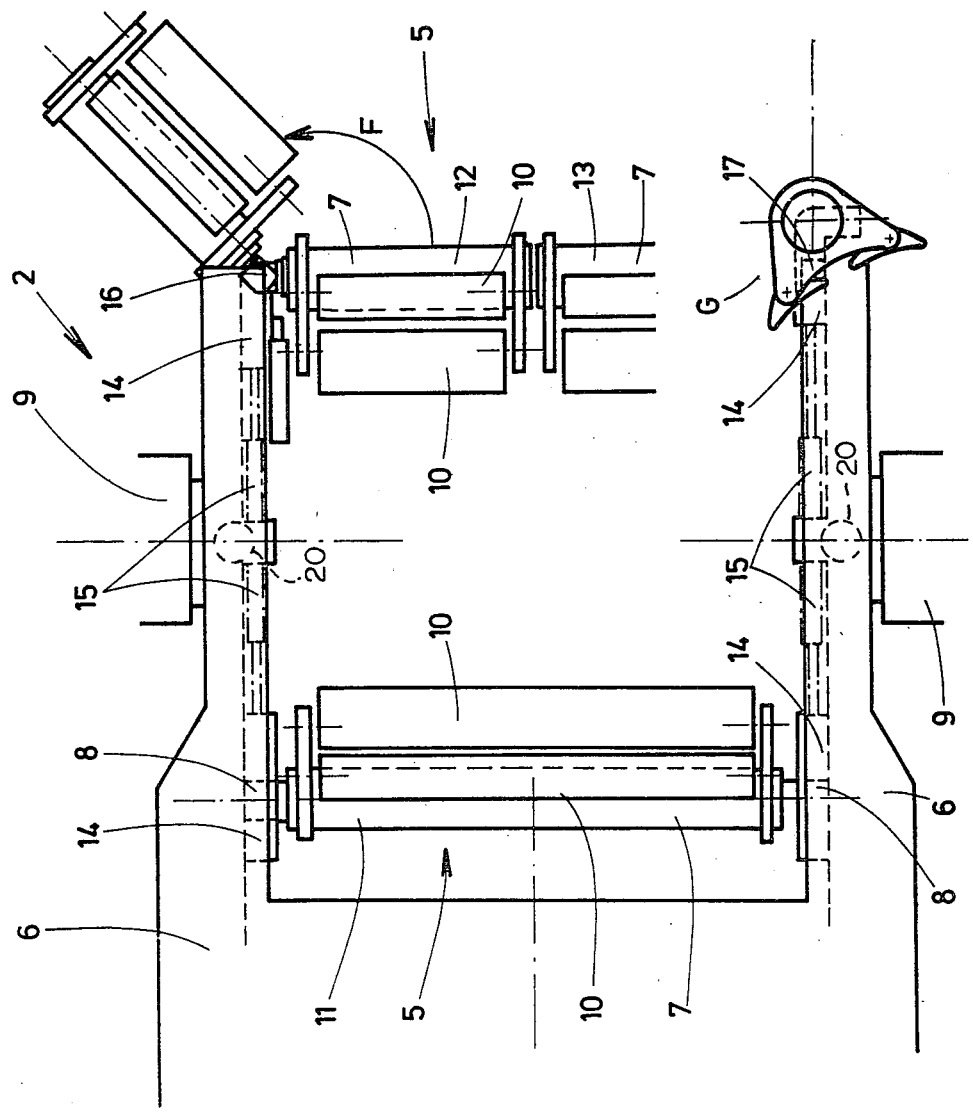
FIG. 2 is a part view from above of the catching and holding means of the hauling vehicle.

As shown in FIG. 2, the catching and holding devices 2 carry abutments 5 positioned when working at each side of the wheels of the aircraft. Said abutments 5 consist of sole-pieces 7 mounted pivotally about an axle 8 on the framework 6. Said framework 6 also carries the axle-tree 9 supporting the wheels of the hauling vehicle. Said sole-pieces 7 carry shoes 10 which apply against the circumference of the wheels of the aircraft, not shown in FIG. 2. Said shoes 10 also are mounted pivotally on said sole-pieces 7. The abutments 5 consist of a main sole-piece 11 extending all over the width of the framework 6 and of two half-sole-pieces 12, 13 located in prolongation of one another, each of them covering the half-width of the framework 6. The sole-piece 11 as well as the sole-pieces 12 and 13 are capable to move in straight line through slides 14 integral with the axles 8 and actuated by jacks 15. Said sole-pieces 12 and 13 are furthermore capable of pivoting horizontally according to Arrow F about a vertical axle 16 under the effect of a hydraulic jack. Also, they can pivot vertically about a horizontal axle 17 to a vertical position G under the effect of a hydraulic jack. The horizontal and vertical motions of the sole-pieces 12 and 13 permit positioning the wheels of the aircraft within the space delimited by the catching and holding devices. When the wheels of the aircraft are thus positioned, the jacks 15 are actuated so as to make said sole-pieces 11, 12, 13 apply and more particularly the shoes 10 against the wheels of the aircraft. The sole-pieces 11, 12, 13 and the shoes 10 are automatically directed through the pressure of the pneumatics. When the wheels of the aircraft are tightened in the device 2, they are then lifted up a few centimeters above the ground.

Two means are available for performing said lifting up. The first one consists in raising the framework of the hauling vehicle by activating the suspension of said vehicle by means of devices already known, such as by hydraulic jacks 20 which raise the frame 6 above axle-tree 9. The second consists in raising the part of the framework to which the holding and tightening devices are secured. According to the second means, it is possible to raise said part of the framework by articulating the latter at the front part thereof and subjecting it to the action of jacks mounted at the rear portion of the part of the framework.

Figure 3:
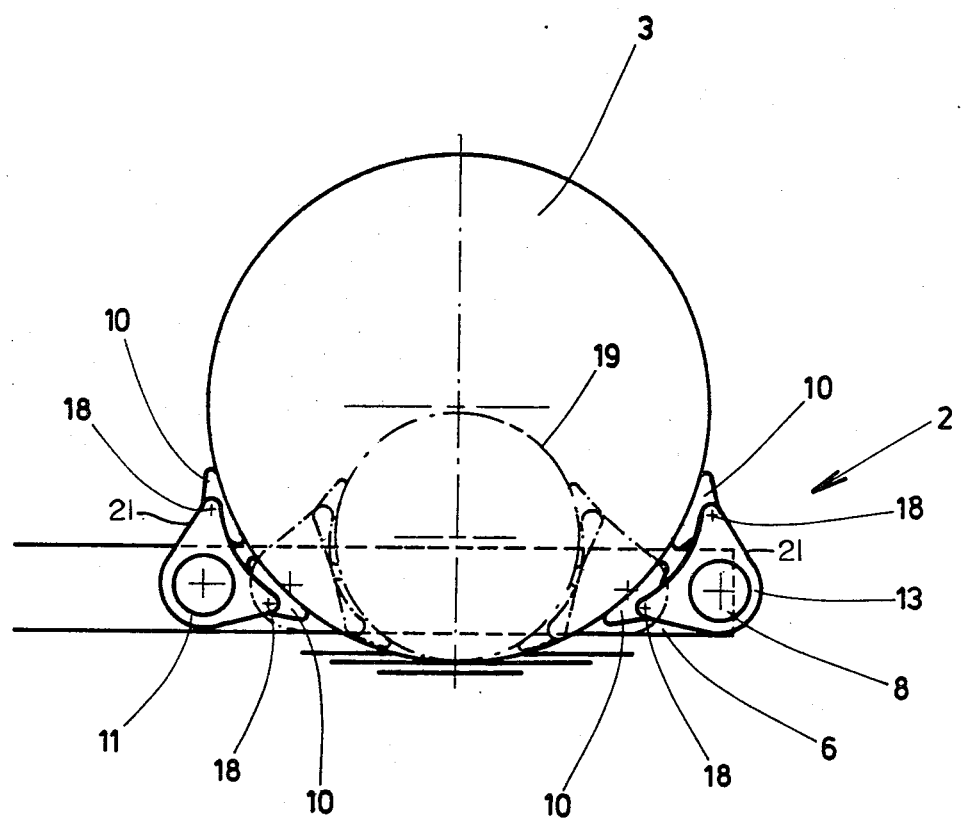
FIG. 3 is a side view of the catching and holding devices of the hauling vehicle.

As shown in FIG. 3, the device 2 carries a main sole-piece 11 and secondary sole-pieces 13 and 12, the sole-piece 13 only being shown in said Figure. Said main sole-piece 11 and secondary sole-pieces 13 and 12 are mounted pivoting on the framework 6. The main sole-piece 11 and the secondary ones 13 and 12 carry shoes 10 mounted pivotally and which apply against the circumference of the wheel 3. It is possible to imagine further solutions for the shoes 10. Thus, it is possible to substitute for example rollers for said shoes 10, or for applying surfaces such as an endless strip which would be secured to the sole-pieces 11, 12 and 13.

The axles 8 of the sole-pieces and the axles 18 of the shoes are subjected to the action of a flexible device 21 permitting to hold the shoes 10 in a desired position. This makes it possible to adapt the tightening and holding devices 2 to various types of wheels with different diameters. Thus, in FIG. 3 a wheel 19 with a diameter far smaller than that of the wheel 3 is shown in dotted line. Said wheel 19 is loaded on the sole-pieces and shoes of the device 2 also shown in dotted line in said FIG. 3.

What I claim is:

1. A hauling vehicle especially for hauling big aircraft, comprising a framework provided with a recess extending inwardly from one end and having parallel side walls, said side walls having longitudinally extending guideways therein, a pair of longitudinally spaced slides disposed in each guideway at the outer end and the inner end thereof respectively, inner and outer elongated horizontal support members provided with axles mounted in said slides, an upper shoe and a lower shoe pivotally connected at their ends with each support member on parallel axes parallel to the support member, the shoes and support member at the outer end of said recess being swingable away from the recess temporarily to open its outer end for entrance of aircraft wheels, and means operative after said last-mentioned shoes are swung back to close the recess for moving the slides in each guideway toward each other to engage all of said shoes with aircraft wheels in said recess.

2. A hauling vehicle according to claim 1, in which said slide moving means include a hydraulic jack disposed at each side of said recess between the slides at that side.

3. A hauling vehicle according to claim 1, in which said support member and shoes at the inner end of said recess extend nearly the full width of the recess, and the support member and shoes at the opposite end of the recess are separated midway between the opposite sides of the recess into two normally aligned units each supported at its outer end by one of said slides.

4. A hauling vehicle according to claim 3, including vehicle wheels at opposite sides of said framework recess for supporting the framework on an axis substantially midway between said support members, and vehicle wheels at the opposite end of the vehicle, whereby the weight transmitted through the aircraft wheels to said vehicle is in a vertical plane substantially coinciding with the axis of said first-mentioned vehicle wheels.

5. A hauling vehicle according to claim 1, including parallel brackets rigidly mounted on the ends of said support members and extending toward the opposite end of said recess, the ends of said shoes being pivotally mounted in said brackets.

6. A hauling vehicle according to claim 1, including means to lift the framework.

* * * * *